March 13, 1962     H. C. FLINT     3,025,102
SEAT CONSTRUCTION

Filed Nov. 25, 1957     5 Sheets-Sheet 1

INVENTOR.
Hyland C. Flint
BY
Harness, Dickey & Pierce
ATTORNEYS

March 13, 1962

H. C. FLINT 3,025,102

SEAT CONSTRUCTION

Filed Nov. 25, 1957

INVENTOR.
Hyland C. Flint.
BY
Harness, Dickey & Pierce
ATTORNEYS.

United States Patent Office 3,025,102
Patented Mar. 13, 1962

3,025,102
SEAT CONSTRUCTION
Hyland C. Flint, Novi Township, Oakland County, Mich.
(40550 W. Ten Mile Road, Novi, Mich.)
Filed Nov. 25, 1957, Ser. No. 698,497
10 Claims. (Cl. 297—113)

This invention relates to seats, and particularly unison seats and an improved frame and spring assembly for such a seat as constructed prior to upholstering.

Figures 3, 4, 5, 6, 13:
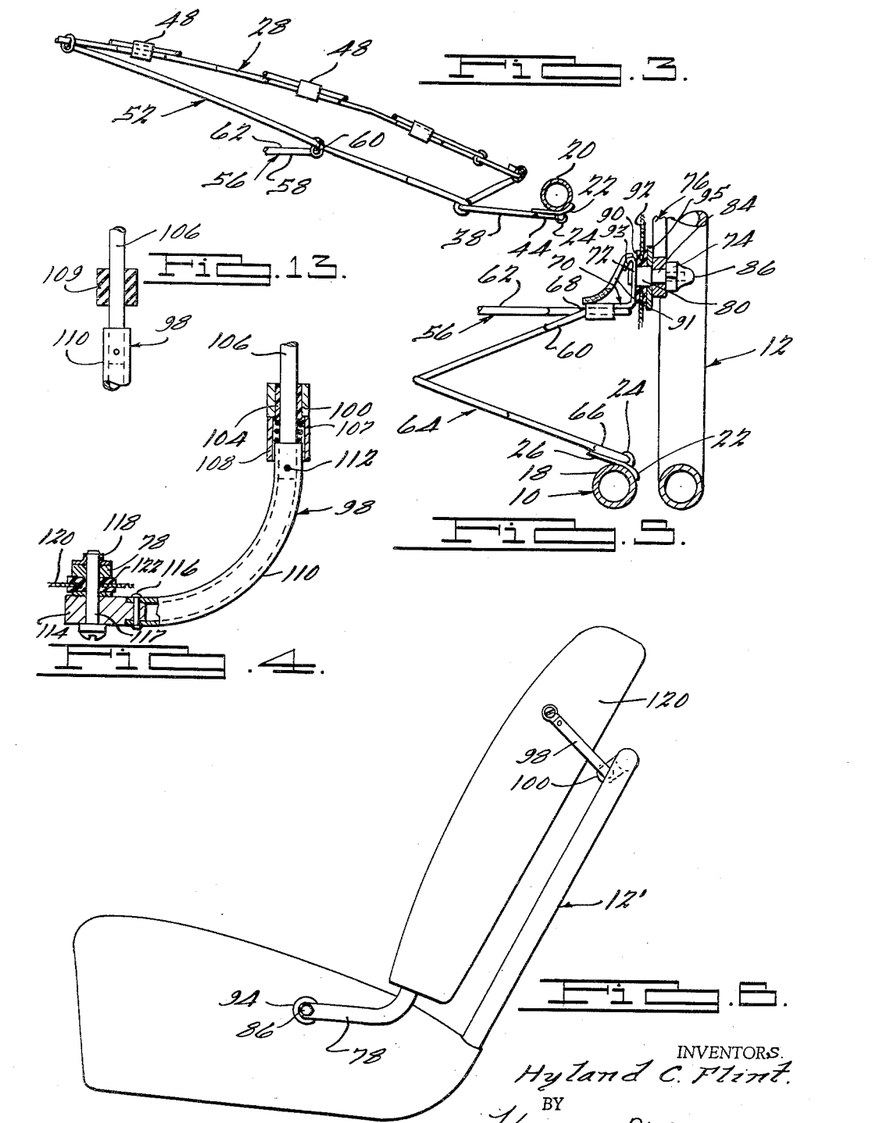
FIG. 3 is an enlarged broken sectional view of the structure illustrated in FIG. 2, taken on the line 3—3 thereof.
FIG. 4 is an enlarged broken sectional view of the structure illustrated in FIG. 1, taken on the line 4—4 thereof.
FIG. 5 is an enlarged broken sectional view of the structure illustrated in FIG. 2, taken on the line 5—5 thereof.
FIG. 6 is a side elevational view of a unison seat constructed according to a modified form of the present invention.
FIG. 13 is a view of structure, similar to that illustrated in FIG. 4, showing another form of the invention.

The present invention pertains to a frame and spring assembly for a seat as used primarily in automotive vehicles. In the accompanying drawings the frame is shown as made of tubular construction having stamped elements applied thereto. It will be understood that the frame may be made of stampings incorporating the stamped elements herein illustrated as applied to the tubing. Also, in the drawings the frame is illustrated as including a seat frame and a separately formed back frame pivotally mounted on the seat frame for movement between a position of normal use and a tilted forward position to which it may be moved when, for example, the seat is used as the front seat of a two-door automobile and it is desired to tilt the back forwardly to facilitate access to the rear seat. It will be understood that in certain aspects of the present invention the seat frame and the back frame may be integrally formed as a single frame. Such a construction is illustrated in FIGURE 6.

The seat frame supports a spring assembly providing a seating area and including a plurality of formed wire spring strips, the opposite ends of which are connected to the front and rear of the seat frame. The spring strips consist of a series of loops, the adjacent ones of which are oppositely presenting, each loop being formed by a pair of parallel torsion bars extending transversely of the spring strip and a side bar interconnecting the torsion bars at adjacent ends thereof. Spring strips of this type are illustrated, described and claimed in United States Letters Patent No. 2,684,844 granted July 27, 1954. A desired softness of the front and rear edges of the seating area is afforded by reversely bending the end portions to provide supporting legs having V-shaped portions disposed below these edges. To provide the desired height of the front edge of the seating area above the seat frame, while avoiding excessive softness of this front edge, the front leg of the spring strip has a straight, vertically disposed section of wire constituting one of the side bars of the spring strip, which supports the lower end of the V-shaped portion at a point above the seat frame, such that the desired softness of the front edge of the seating is obtained. The spring strips are held in desired relation and the seating area is outlined on the front and sides by a border wire which is clipped to the spring strips along the front edge of the seating area, and is connected to the outer spring strips through a filler wire disposed between the border wire and the outer spring strips. The spring strips are provided with bracing wires as disclosed in United States Letters Patent No. 2,719,578 granted October 4, 1955, on application of H. C. Flint. These bracing wires, in the preferred embodiment illustrated, have their rear ends connected to the apices of the V-shaped rear legs of the spring strips and their front ends connected to one of the torsion bars approximately one quarter of the distance rearwardly from the front edge of the seating area. The bracing wires may, of course, be connected in various other ways providing both a body conforming support and a primary load support.

Also mounted on the seat frame is a spring strip which extends transversely of and below the above mentioned spring strips. This spring strip both supports the bracing wires to co-operate in providing the primary load support and is connected to and supports an auxiliary frame which carries sinuous spring strips which provide a back rest area. This auxiliary frame is made of bar stock or other suitable material and includes side members carrying attaching means for the sinuous spring strips and transverse members holding the side members in spaced parallel relation. In the construction illustrated, the support of the auxiliary frame is through brackets to which the lower ends of the side members are pivotally connected and which are carried by a part of the primary load support so that the auxiliary frame moves up and down in response to movement of the primary load support. These brackets are mounted on the transverse spring strip outwardly of the outer bracing wires. This transverse spring strip also has reverse bends forming V-shaped legs at its opposite ends and the upper side bar of each leg is bent so that one portion of it extends in spaced parallel relation to the outer side bar at the adjacent end of the portion intermediate the legs, and co-operates with the interconnecting torsion or cross bar to provide a platform on which the bracket is supported. The auxiliary frame is connected to the back frame for movement generally therealong by a U-shaped frame bar which is pivotally mounted on the back frame in pivot blocks mounted at the upper end thereof and pivotally connected to the upper portion of the auxiliary frame. It will be understood that any other suitable means may be used for mounting the auxiliary frame for the required movement relative to the back frame.

Accordingly, the main objects of the present invention are: to provide an improved unison seat having a spring assembly providing both a body conforming support and a primary load support and means providing a back rest area which is movable with the primary load support; to provide such an improved unison seat, the back of which is movable from a normal position to a tilted forward position; to provide an improved unison seat including spring means including a portion providing a preliminary or body conforming support and additional spring means disposed below said portion which both co-operates in providing a primary load support and supports the means providing the back rest area; to provide such an improved unison seat spring means in which the primary support means includes spring means which is disposed in the path of movement of the preliminary body conforming support means and which supports the unison back; to provide a spring cushion including a frame, a plurality of formed wire spring strips including a leg having a V-shaped portion providing a desired softness of support and a straight section of wire to provide a desired overall height of leg without excessive softness; to provide a spring assembly including a formed wire spring strip having a bracket supporting portion formed by bending the upper side bar of an inclined leg portion so that part of it is in spaced parallel relation to the outer side bar of the adjacent portion supported by the leg and thus providing spaced parallel side bar portions and an interconnecting torsion or cross bar upon which the bracket is supported; and, in general, to provide a unison seat frame and spring assembly which is simple in design, economical of manufacture, and reliable and effective in operation.

Other objects and features of novelty of the present invention will be appreciated by those skilled in the art from a consideration of the following specification, the appended claims, and the accompanying drawings, wherein:

The figures of the drawings, with the exception of FIG. 6, which is an elevational view of a completely upholstered seat, show the frame and spring assembly of a unison seat prior to the application of the padding and upholstery material. In the preferred embodiment illustrated, the frame includes a seat frame 10 and a separately formed back frame 12 which is pivotally connected to the seat frame 10 by a pivot pin 14 to provide for pivotal movement between the normal position illustrated in full lines in FIGURE 1 and the tilted forward position there illustrated in broken lines. It will be understood that where such tilting movement is not required, the seat frame and the back frame may be integrally formed as a single frame, as is illustrated in FIGURE 6.

Figure 1:
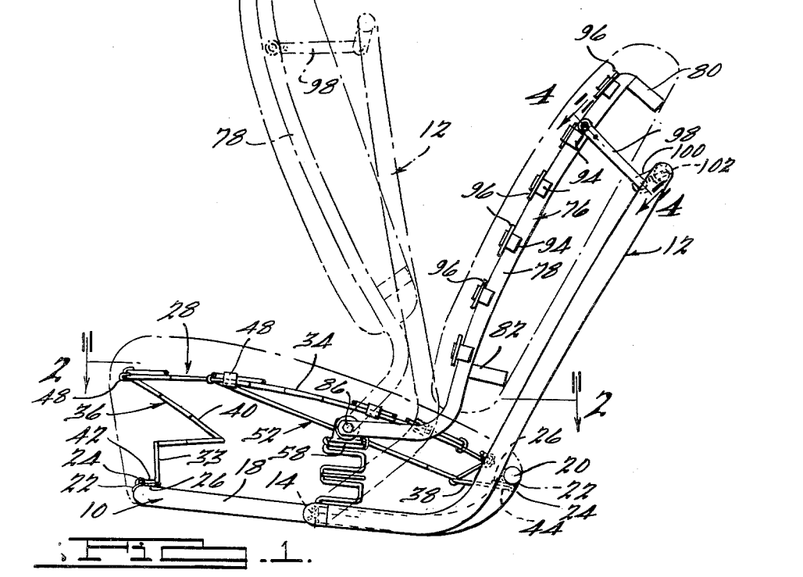
FIGURE 1 is a view in side elevation of a unison seat prior to padding and upholstery, embodying features of the present invention and showing a tilted forward position of the back in broken lines and showing the outline of the upholstery in broken lines.
Figure 2:
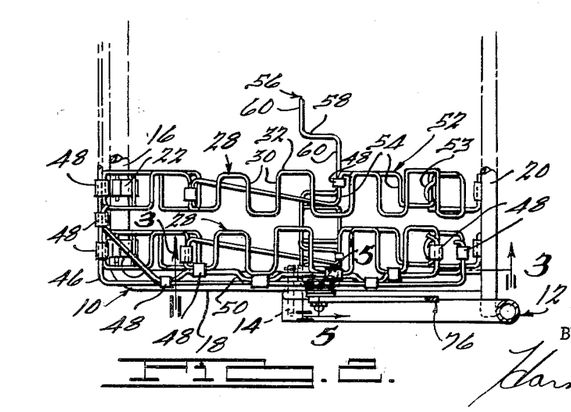
FIG. 2 is a broken sectional view of the structure illustrated in FIG. 1, taken on the line 2—2 thereof.

In the construction illustrated, the seat frame 10 and the back frame 12 are formed of tubular material, the seat frame 10 including a generally U-shaped tubular section having its web portion 16 constituting the front of the frame, and its parallel legs 18 constituting the sides of the frame. At their rear ends these sides 18 are upwardly turned and welded or otherwise suitably connected to a tubular element 20 at points spaced inwardly from the ends of the bar 20, as best illustrated in FIGURES 1 and 2. This tubular element 20 constitutes the rear of the seat frame 10 and the cantilever portions of the element 20 extending outwardly of the sides 18, constitute abutments which support the back frame 12 in its normal position, as illustrated in full lines in FIGURE 1.

The front section 16 and the rear element 20 of the frame 10 have spring strip attaching clips 22 fixed thereon and spaced therealong. These clips 22 are preferably generally of the construction illustrated and described in greater detail in United States Letters Patent No. 2,526,184. The clips 22 are formed of a stamping having a portion fitting the frame element upon which it is mounted, a portion struck out to provide a tunnel 24 adapted to receive the terminal portion of a spring strip, and a support portion indicated at 26 adapted to support a portion of the spring strip to prevent pivotal movement of the strip in one direction, as hereinafter described. A plurality of parallel spring strips generally indicated at 28 extend along the seat frame 10 from front to rear and have their opposite ends connected to the front frame section 16 and the rear element 20 by the attaching clips 22. These springs strips 28, in the preferred embodiment illustrated, are of formed wire shaped to define a plurality of loops the adjacent ones of which are oppositely presenting, as best illustrated in FIGURE 2. Each of these loops includes a pair of spaced parallel torsion bars 30 which extend transversely of the length of the spring strip 28 and a bendable bar or side bar 32 interconnecting the torsion bars 30 at adjacent ends thereof and extending in the direction of the length of the spring strip 28. The length of these bars 30 and 32, and hence the proportions of the loops, may be varied throughout the spring strips 28 to provide desired variations in the resiliency and spring rate. Such a variation of both the torsion bars 30 and the side bars 32 is clearly illustrated in FIGURE 2.

The spring strips 28 include arched portions 34 providing a seating area, front legs 36 extending between the front edge of the seating area and the front section 16 of the seat frame, and rear legs 38 extending between the rear edge of the seating area and the rear element 20 of the seat frame. The front legs 36 include an upper V-shaped portion 40 formed by reversely bending the strip 28 at the front edge of the seating area and again at the ajex of the V-shaped portion. The proportions of this V-shaped portion 40 and the proportions of the loops of which it is formed, are such as to support the front edge of the seating area with the desired degree of softness. This upper, V-shaped portion 40 is supported at a desired height above the front section 16 of the frame 10 so that the front edge of the seating area is at a desired height above the bar 16, by a generally vertically disposed side bar 34 which connects the lower end of the V-shaped portion 40 to a small terminal loop 42, the end portion of which is received in the tunnel 24 of a clip 22 and the remainder of which is supported on the support portion 26 of the clip 22, as best illustrated in FIGURE 1, to prevent pivotal movement of the strip in a clockwise direction, as there illustrated, about the tunnel 24. This construction avoids the excessive softness of support of the front edge of the seating area which would result if the vertical side bar 34 were eliminated and the mouth of the V-shaped portion 40 opened up to cover the full height of the front edge of the seating area above the frame 10.

The rear leg 38 of each spring strip 28 is also V-shaped, as shown in FIGURE 1 and has a small terminal loop 44. It will be noted that the clips 22 mounted on the rear bar 20 are disposed at the underside thereof. The end portions of the loops are received in the tunnels 24 and the remaining portions of the loops 44 engage the support portions 26 of the clips 22 against which they are held by virtue of a desired preloading of the spring strips 28 upon assembly.

The spring strips 28 are held in the desired spaced parallel relation by a border wire 46 which is generally U-shaped and extends around the front and side edges of the seating area. Across the front the border wire 46 is clipped to a torsion bar 30 of each of the spring strips 28 by clips 48. The opposite ends of the border wire 46 are inwardly turned and secured to the torsion bars 30 at the rear of the outer spring strips 28 by clips 48 as illustrated in FIGURE 2. Along each side of the seating area the border wire 46 is connected to the outer spring strip 28 by a filler wire 50 which is disposed in the space between the border wire 46 and the outer spring strip 28 and is alternately clipped to the border wire 46 and to the adjacent side bars of the outer spring strip 28, by clips 48. The forward end of the filler strip 50 extends over the outer spring strip 28 and is secured to the border wire 46 at the front edge of the seating area by a clip 48. The rear end of the filler strip 50 is inwardly turned short of the rear edge of the seating area and is clipped to a torsion bar of the outer spring strip 28.

The spring strips 28 are provided with bracing wires 52, various forms of which are illustrated and described in United States Letters Patent No. 2,719,578. In the preferred construction illustrated herein, the bracing wires 52 are disposed below the seating area and connect the torsion bar 30 at the apex of the V-shaped rear leg 38 to a torsion bar of the spring strip intermediate portion 34 rearwardly of the front edge of the seating area. The rear end portion of the bracing wire 52 may be secured to the torsion bar 30 of the rear leg 38 by winding it thereabout as at 53 in FIGURE 2, or if desired, it may be secured thereto by one of the clips 48. In the construction illustrated, the forward end of each bracing wire 52 is clipped to a torsion bar spaced rearwardly from the front end of the seating area so that the bracing wires 52 underlie approximately the rear three-fourths of the intermediate portions 34 and the seating area which they provide. These rear parts of the intermediate portions 34 of the spring strips 28 constitute a body conforming support. The bracing wires 52 are disposed below and in the path of movement of this body conforming support and co-operate with the remaining portions of the spring strips 28 to constitute a part of the primary load support. The bracing wires 52 are formed to provide at least one transversely extending torsion bar section 54 intermediate their ends and in the construction shown, a second torsion bar 54 is provided near the rear end of each bracing wire 52. It will be appreciated, of course, that as mentioned above with reference to the spring strips 28, the gauge and shape of the bracing wires 52 may be varied to provide the desired resilience and spring rate.

In the preferred construction illustrated, a part of the primary load support is contributed by a transversely formed wire spring strip 56 which extends across the seat frame 10 from side to side generally medially thereof and is disposed below the bracing wires 52. The spring strip 56 has oppositely presenting loops formed of torsion bars 58 and side bars 60 (see FIGURE 2) in the same manner as the spring strips 28, and includes a slightly arched generally horizontally extending intermediate section 62 and V-shaped legs 64 (see FIGURE 5). The sides 18 of the seat frame 10 each carry an attaching clip 22, the tunnel 24 of which receives a terminal portion of one of the legs 64 and the support section 26 of which supports the remainder of a small end loop 66 at the lower end of the leg 64. The intermediate section 62 of the spring strip 56 interconnects and supports the bracing wires 52. This is effected by securing one of the torsion bars 54 of each of the bracing wires to one of the side bars 60 of the spring strip 56 by a clip 48.

At the upper end of each leg 64 the side bar 60 is bent as indicated at 68 so that the upper end portion of this side bar 60 is parallel to the side bar 60 at the end of the intermediate section 56 and co-operates therewith and with the interconnecting torsion bar 58 to support a bracket 70 which is secured thereto. This construction of the spring strip 56 facilitates mounting of the bracket 70 and results in the point 68 being, in effect, the upper end of the leg 64.

The bracket 70 extends outwardly over this just mentioned torsion bar 58 and has an upturned flange 72 in which is riveted a shouldered stud 74 best illustrated in FIGURE 5, which pivotally supports the lower end of an auxiliary frame 76. This frame 76 consists of a pair of spaced side members 78 which are generally L-shaped and the upper arms of which are interconnected by upper and lower U-shaped cross members 80 and 82. At its lower end each side member 78 is pivotally mounted on an intermediate pinion portion 84 of the stud 74, on which it is held by a cap nut 86 received on the threaded outer end of the stud 74. The inner portion 88 of the stud 74 extends through a grommet 90 mounted in the upholstery material 92 and through a washer 95 which spaces the side frame members 78 from the upholstery material 92. Each of the brackets 70 carries a pad 91, of any suitable sound deadening material, which prevents metal to metal contact between the border wire 46 and the bracket 70. This pad 91, which is omitted from the figures, other than FIGURE 5, for purposes of clarity of other details, may be mounted in any suitable way, and is shown in FIGURE 5 as glued to an inwardly turned end portion 93 of flange 72, from which it extends inwardly and downwardly to the flat upper surface portion of bracket 70.

The side members 78 of the frame 76 carry a plurality of attaching clips 94 spaced vertically therealong and a plurality of horizontally extending spring strips 96 are attached thereto and provide a back rest area. The auxiliary frame 76 is connected to the back frame 12, for the movement generally therealong which is required in the functioning of the seat as a unison seat, by a U-shaped link generally indicated at 98 which is journalled in a pair of laterally spaced supporting blocks 100 mounted on a transversely extending upper portion of the back frame 12. These supporting blocks 100 extend forwardly and downwardly from this transverse section of the back frame 12, to which they are secured by screws 102, and are provided with bearings 104. The U-shaped links 98 are interconnected by a rod 106 which extends into the ends thereof and is secured in position by pins 112. The rod engages the bearings 104 in the supporting blocks 100, the bearings being made from a low friction resin material to permit an oscillatable and lateral movement therebetween. A spring 107 extends over the ends of the rod located between the block 100 and the ends of the links 98 to permit the lateral shifting movement of the blocks relative to the links and for centering the blocks relative thereto. A tubular member 108 may be secured to the block 100 to extend over the end of the links 98 and enclose the springs 107 to hide them from view.

Figures 10, 11, 12, 14:
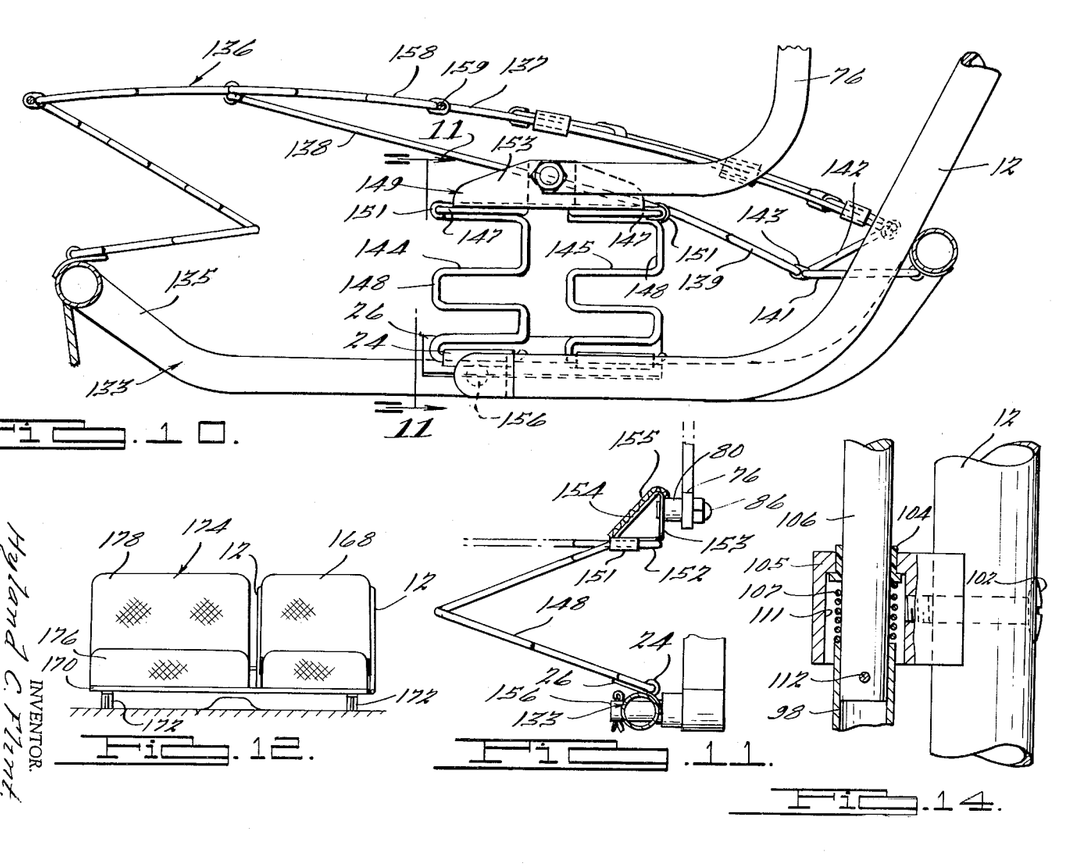
FIG. 10 is a sectional view of the structure illustrated in FIG. 9, taken on the line 10—10 thereof.
FIG. 11 is a sectional view of the structure illustrated in FIG. 10, taken on the line 11—11 thereof.
FIG. 12 is a reduced view in elevation of a combination seat embodying features of the present invention.
FIG. 14 is a view of structure, similar to that illustrated in FIG. 4, showing another form which the structure may assume.

A similar construction is to be found in FIG. 14 wherein the blocks 105 have a low friction resin sleeve 104 therein engaged by the ends of the rod 106, the blocks having an enlarged aperture 111 which encloses the springs 107 located between the low friction sleeve 104 and the end of the link 98.

A further form of support is illustrated in FIG. 13, that wherein a pair of blocks 109, made of rubber, are secured to the back frame 12 and are provided with an aperture engaged by the rod 106. The frictional engagement between the ends of the rod and the rubber blocks prevents the sliding of the rod within the aperture and the lateral deflection occurs by the deflection of the blocks. When the rod is held in this manner, the blocks will maintain the rod in central relation to the back frame 12 and will be able to rotate in the block apertures. The low friction sleeve could be provided within the rubber block to permit the rod to slide back and forth therein, and in such an arrangement springs 107 would be required to center the rod relative to the back frame. In any of the structures illustrated in FIGS. 4, 13 and 14, the vibration to the back frame 12 or 12' from the floor of the body is not transferred in shock to the seat back because of the mounting relationship of the rod 106 with the back element 12 or 12' since the rod is free to rotate and move laterally relative thereto. Each elbow 110 extends forwardly and at its forward end carries a fitting 114 secured thereto by a pin 116. The fitting 114 is pivotally connected to the frame 76 by a screw 117 which extends through the fitting 114 and the side member 78 of the frame 76 and receives an elastic stop nut 118 on its threaded inner end. The upholstery material 120 of the back is provided with a grommet 122 through which the screw 117 extends and a washer 124 is provided to space the fitting 114 and elbow 110 from the upholstery material 120. For the limited arc of movement of the U-shaped link 98, its forward end, including the fitting 114 and hence the frame 76 to which it is connected, moves generally along the frame 12.

It will, of course, be understood that the finished seat includes suitable padding and upholstery which may be secured in place in any suitable manner.

When the seat shown in FIGURES 1 to 5 inclusive is occupied, the deflection of the intermediate section 34 of the spring strip 28 provides a body conforming support. As the full weight of the occupant is taken by the seat, the bracing wires 52 and the transverse spring strip 56 co-operate with the spring strips 28 to provide the primary load support. As the bracing wires 52 and transverse spring strip 56 are deflected downwardly under the load, the auxiliary frame 76 and the back rest provided by its springs 96 moves downwardly in unison with this portion of the primary support. And subsequently, when there are variations in the deflection of the primary load support, as for example, during road shocks, the back support carried by this auxiliary frame 76 moves in unison with the primary load support. When the back frame 12 and the auxiliary frame 76 are pivoted forwardly, as in facilitating access to the rear seat of a two seated automobile, these parts assume the positions illustrated in FIGURE 1.

FIGURE 6 illustrated a modified form which is shown fully upholstered and differs from the form shown in FIGURES 1 to 5 only in that in place of the separate frames 10 and 12, it uses a unitary frame 12' and, of course, the back is not capable of the tilting action illustrated in FIGURE 1.

Referring to FIGURES 7 to 11, a further form of the invention is illustrated, that wherein two of the seats as illustrated in FIGURES 1 to 5 have been constructed on the ends of an elongated frame which extends across the width of the vehicle. Between the seats a central seating section is provided having a tiltable back rest therebetween which is usable as an arm rest when tilted forwardly. The frame 130 has a frontwardly extending portion 131, two outer side portions, and a portion 132 which extends across the back. The front and back portions 131 and 132 are joined together by frame members 133 and 134 in spaced-apart relationship near the center of the frame. These elements 133 and 134 are similar in shape to the endmost elements which are not illustrated in FIGS. 7 and 8 but follow the shape of the element 133, as illustrated in FIG. 10. The front section 135 extends upwardly in this construction to thereby eliminate the straight vertical leg portion 34 of the spring unit 28. Otherwise, the spring unit 136 which is mounted across the frame portions 131 and 132 is similar to the spring unit 28 or substantially similar to that illustrated in Patent No. 2,684,844 above mentioned. The spring 136 has the load-bearing section 137 and the brace rod 138 disposed therebelow secured in a similar manner as above described with regard to the brace rod 52 of the structure illustrated in FIGS. 1 to 5. In the present instance, the torsion bar at the end of the loop 139 of the brace rod is secured to the apex 141 of the V-shaped supporting element 142 at the rear of the spring 136 by a band 143.

Instead of a single spring 56 extending transversely beneath the springs 136, the present arrangement employs a pair of springs 144 and 145 of similar shape to the spring 56 secured between the two outer portions of the frame 130 and the spaced cross members 133 and 134. The side bars of the spring 145 are connected to a torsion bar 146 of the brace rods 138 by a band 143. The end torsion bars 147 from which the V-shaped supporting portions 148 extend downwardly have mounted thereon a stamping 149 secured in position by extending arm portions 151 which are clinched over the horizontal portions of the side bar sections 152 of the V-shaped portions 148 of the springs 144 and 145 which are in the plane of the torsion bars 147. An upstanding flange 153 supports the stud 80 in a similar manner to that illustrated in FIG. 5. The central portion of the flange has a web portion 154 which is bent inwardly and downwardly and welded to the inner edge of the horizontal portion of the stamping to reinforce the face of the flange 153 at the point where the stud 80 is secured. Preferably a strip of material 155 is secured to the face of the web 154 for the purpose of preventing noise occurring when the load supporting portion 137 of the spring disposed thereabove moves downwardly into engagement therewith.

The back frame 12 is the same as that above described and is connected in the same manner to the auxiliary back frame 76, the former being pivoted to the two outer portions of the frame and to the two spaced central frame elements 133 and 134 by pins 156 in the same manner as described hereinabove. Similarly, the two frames 12 and 76 are interconnected to each other in the same manner as hereinabove illustrated in FIGS. 1 to 5 and will not be further described. As a result of this construction, the inner elements of the back frame portions 12 and 76 are in spaced apart relationship, the distance being substantially equal to the spacing of the frame members 133 and 134. Interjacent this space, three springs strips 157 are mounted across the front and rear frame elements 131 and 132 and a pair of short spring strips 158 extend from the front element 131 rearwardly where the end is joined to the lateral portion 159 of U-shaped wire elements 161. The U-shaped portion of the strip is aligned with the inner vertical sections of the back frames 12 and 76. This permits the back frame to be pivoted forwardly without interfering with the load bearing seat supporting structure.

Figures 7, 8:
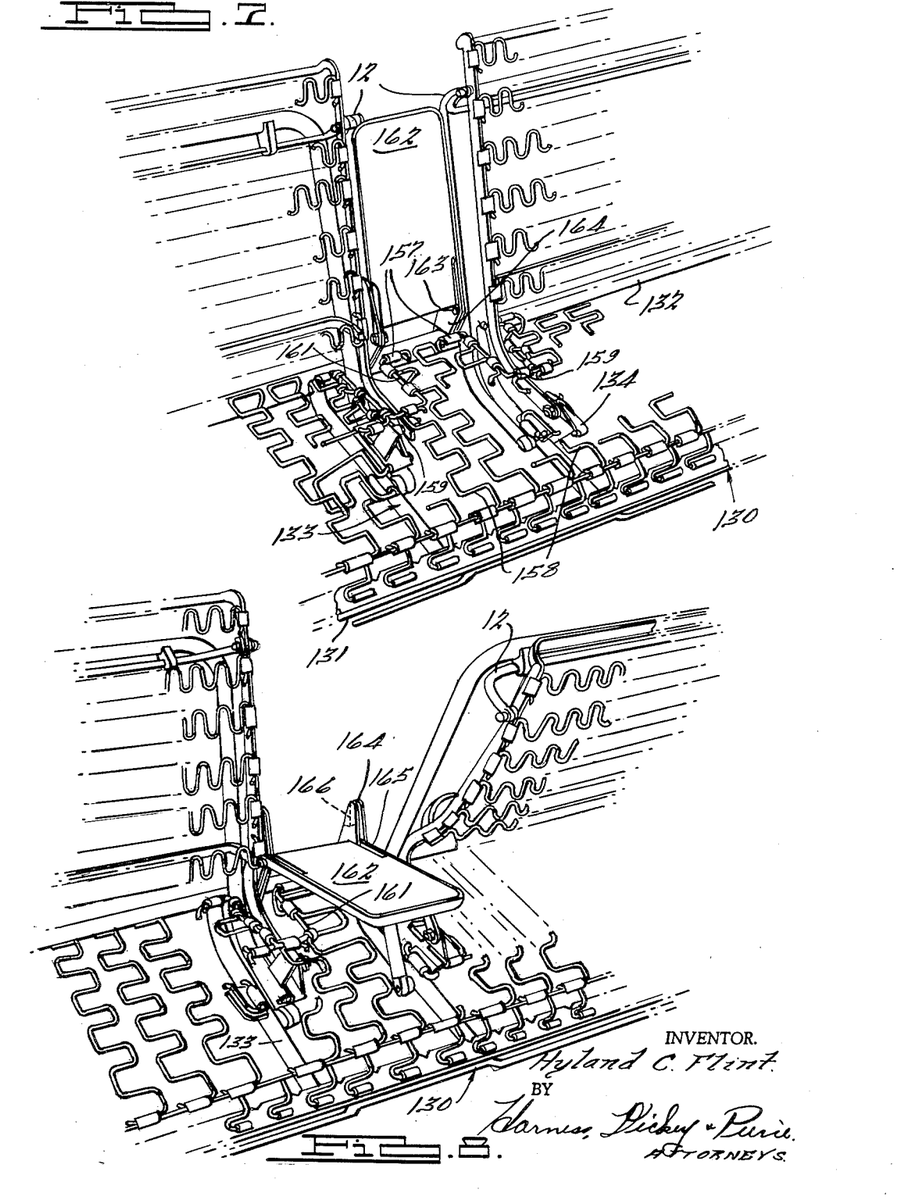
FIG. 7 is a broken perspective view of the seat, similar to that illustrated in FIGS. 1 to 5, which extends entirely across the vehicle body.
FIG. 8 is a view of the structure illustrated in FIG. 7, with the central back portion and the driver back section tilted forwardly.
Figure 9:
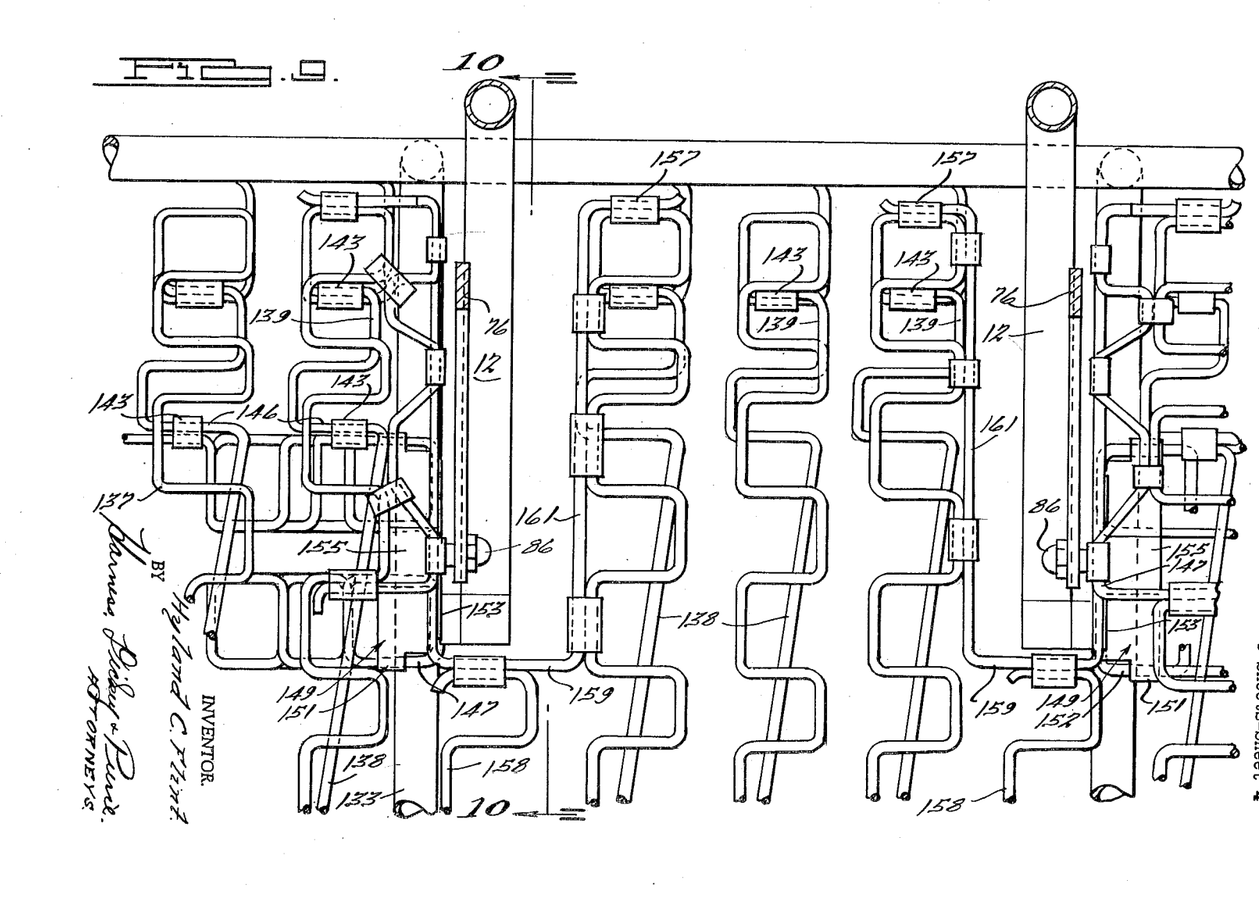
FIG. 9 is an enlarged broken plan view of the seating portion of the structure illustrated in FIGS. 7 and 8.

Between the back frames 12 and 76, an armrest and back support 162 is secured by pivots 163 to upstanding channel-shaped arms 164 from the rear frame element 132. The pivots pass through a strap 165 which extends around the edge of the board and which abuts against a stop element 166 in the upper end of the channel-shaped arms 164. Preferably a pad of rubber is placed upon the front face of the board 162 which may be three or four inches thick, depending upon the thickness of the back cushions. At least one inch of foam rubber is placed upon the back of the board to provide a soft cushion when the board is pushed forwardly, as illustrated in FIG. 8, to form an armrest.

The seat is trimmed in the usual manner except about the U-shaped elements 161 where the trim material extends inwardly and downwardly to maintain the slot provided thereby in which the adjacent portions of the back frame elements 12 and 76 may move when tilted forwardly. The structure illustrated and described in FIGS. 7 to 11 extends the inventive concept of FIGS. 1 to 5 by applying a pair of the seats having the tiltable backs on the side portions of a single frame which extends across the entire width of a vehicle. The space between the seats is provided with strips of spring to form a seating area at the center of the construction with a shorter spring at each side connected to U-shaped elements into which the adjacent arms of the back move when the back is tilted. A back rest is mounted between the seats above a central occupant which may be tilted forwardly to form an armrest when the seat is occupied by two people. Thus, the central section and either of the side sections of the three back rests of the seating unit may be tilted forwardly, the side sections to permit the ingress of an occupant to the back seating area and the central section to provide an armrest.

Referring to FIG. 12, a further form of the invention is illustrated, that wherein a seat unit 168, similar to that illustrated in FIGS. 1 to 5 inclusive, has been applied to a base frame 170 which extends the full width of the body so as to be supported by a pair of standard seat supporting track members 172. The seat section 174 is of standard design having a seat cushion portion 176 and a back cushion portion 178 which are rigidly secured to the frame 170 in the usual manner. With this combination structure, the seat 168 will support the driver in a manner which permits the back portion to deflect with the seat portion and to shift horizontally relative to the back supporting element 12 to reduce the transfer of shock and vibration thereto. One or more occupants of the seat will sit upon the standard portion of the seat unit and both of the units will be adjusted with the frame 170 forwardly and rearwardly on the seat track members 178 at opposite sides of the body. In this manner, the driver may adjust his seat to any desired position on the standard tracks when the single frame 170 is employed, carrying the standard section of seat along therewith to be retained in aligned relation to the driver's seat unit.

What is claimed is:

1. In a seat construction, a base frame, a back supporting element pivoted on the base frame and extending upwardly therefrom, spring means supported on said base frame and providing a load bearing area for a seat cushion, a load bearing means for a back cushion pivotally secured to the upwardly extending portion of the back supporting element and having forwardly extending arms at the bottom thereof, and pivots supported at the sides of the sprung portion of the seat cushion to which the forwardly projecting arms of the back cushion are pivotally secured in a manner to permit the back supporting element to pivot forwardly with the back cushion.

2. In a seat construction, a base frame, a back supporting element pivoted on the base frame and extending upwardly therefrom, spring means supported on said base frame and providing a load bearing area for a seat cushion, a load bearing means for a back cushion pivotally secured to the upwardly extending portion of the back supporting element and having forwardly extending arms at the bottom thereof, pivots supported at the sides of the sprung portion of the seat cushion to which the forwardly projecting arms of the back cushion are pivotally secured in a manner to permit the back supporting element to pivot forwardly with the back cushion, said seat and back cushion being disposed at one side of the base frame, and a similar seat and back cushion disposed at the other side thereof.

3. In a seat construction, a base frame, a back supporting element pivoted on the base frame and extending upwardly therefrom, spring means supported on said base frame and providing a load bearing area for a seat cushion, a load bearing means for a back cushion pivotally secured to the upwardly extending portion of the back supporting element and having forwardly extending arms at the bottom thereof, pivots supported at the sides of the sprung portion of the seat cushion to which the forwardly projecting arms of the back cushion are pivotally secured in a manner to permit the back supporting element to pivot forwardly with the back cushion, said seat and back cushion being disposed at one side of the base frame, a similar seat and back cushion disposed at the other side thereof, load supporting spring members disposed between the spring means of said seat cushions, and an armrest frame pivotally secured between the load bearing means of the back cushions for movement forwardly onto the last said load supporting spring members.

4. In a seat construction, a base frame, a back supporting element pivoted on the base frame and extending upwardly therefrom, spring means supported on said base frame and providing a load bearing area for a seat cushion, a load bearing means for a back cushion pivotally secured to the upwardly extending portion of the back supporting element and having forwardly extending arms at the bottom thereof, pivots supported at the sides of the sprung portion of the seat cushion to which the forwardly projecting arms of the back cushion are pivotally secured in a manner to permit the back supporting element to pivot forwardly with the back cushion, said seat and back cushions forming a bucket type seat for the driver of the vehicle, and a seat and back cushion of greater width than said bucket type seat supported on the remaining portion of the base frame which extends across the width of the vehicle to form a complete unitary seat.

5. In a seat construction, a base frame, a back supporting element pivoted on the base frame and extending upwardly therefrom, spring means supported on said base frame and providing a load bearing area for a seat cushion, a load bearing means for a back cushion pivotally secured to the upwardly extending portion of the back supporting element and having forwardly extending arms at the bottom thereof, pivots supported at the sides of the sprung portion of the seat cushion to which the forwardly projecting arms of the back cushion are pivotally secured in a manner to permit the back supporting element to pivot forwardly with the back cushion, said support for the pivots comprising spring strips extending transversely across the seat beneath spring strips which form said spring means, brace rods beneath said last spring strips, and means connecting said brace rods to said transverse spring strips.

6. In a seat construction, a base frame, a back supporting element pivoted on the base frame and extending upwardly therefrom, spring means supported on said base frame and providing a load bearing area for a seat cushion, a load bearing means for a back cushion pivotally secured to the upwardly extending portion of the back supporting element and having forwardly extending arms at the bottom thereof, pivots supported at the sides of the sprung portion of the seat cushion to which the forwardly projecting arms of the back cushion are pivotally secured in a manner to permit the back supporting element to pivot forwardly with the back cushion, said pivoted means between said back supporting element and said back cushion embodying a C-shaped member having the ends attached to the sides of the back cushion, and low fristion elements between the ends of said member secured to the back supporting element.

7. In a seat construction, a base frame, a back supporting element pivoted on the base frame and extending upwardly therefrom, spring means supported on said base frame and providing a load bearing area for a seat cushion, a load bearing means for a back cushion pivotally secured to the upwardly extending portion of the back supporting element and having forwardly extending arms at the bottom thereof, pivots supported at the sides of the sprung portion of the seat cushion to which the forwardly projecting arms of the back cushion are pivotally secured in a manner to permit the back supporting element to pivot forwardly with the back cushion, said pivoted means between said back supporting element and said back cushion embodying a C-shaped member having the ends attached to the sides of the back cushion, low friction elements between the ends of said member secured to the back supporting element, and spring means on said member engaging said low friction elements in a manner to center the back cushion relative to said back supporting element.

8. In a seat construction, a base frame, a back supporting element pivoted on the base frame and extending upwardly therefrom, spring means supported on said base frame and providing a load bearing area for a seat cushion, a load bearing means for a back cushion pivotally secured to the upwardly extending portion of the back supporting element and having forwardly extending arms at the bottom thereof, and pivots supported at the sides of the sprung portion of the seat cushion to which the forwardly projecting arms of the back cushion are pivotally secured in a manner to permit the back supporting element to pivot forwardly with the back cushion, said means for pivotally connecting the back cushion to said back supporting element having spring means associated therewith for centering the back cushion relative to said back supporting element.

9. In a seat construction, a base frame, a back supporting element pivoted on the base frame and extending upwardly therefrom, spring means supported on said base frame and providing a load bearing area for a seat cushion, a load bearing means for a back cushion pivotally secured to the upwardly extending portion of the back supporting element and having forwardly extending arms at the bottom thereof, and pivots supported at the sides of the sprung portion of the seat cushion to which the forwardly projecting arms of the back cushion are pivotally secured in a manner to permit the back supporting element to pivot forwardly with the back cushion, the load bearing area of said seat cushion embodying spring strips which have V-shaped front end supporting portions, the bottom arm of the V having a straight section disposed in the vertical plane when the securing end portion thereof is attached to the base.

10. In a seat cushion construction, a base frame having front and rear frame members, spring strips made of wire having oppositely disposed loops providing a seating area, means at the rear of each spring strip by which it is attached to the rear frame member, a V-shaped supporting portion beneath the front end of the load bearing section having a straight section of wire extending downwardly therefrom, and attaching means on the lower end of said straight wire section which maintains it substantially in a vertical plane for supporting the V-shaped portion.

References Cited in the file of this patent

UNITED STATES PATENTS

| | | |
|---|---|---|
| 1,762,623 | Hess | June 10, 1930 |
| 2,265,251 | Reed | Dec. 9, 1941 |
| 2,303,036 | Flint | Nov. 24, 1942 |
| 2,346,414 | Carpenter | Apr. 11, 1944 |
| 2,366,730 | Hickman | Jan. 9, 1945 |
| 2,373,751 | Flint | Apr. 17, 1945 |
| 2,428,217 | Hedley et al. | Sept. 30, 1947 |
| 2,644,505 | Dorton | July 7, 1953 |
| 2,660,223 | Appleton | Nov. 24, 1953 |
| 2,667,912 | McCormick | Feb. 2, 1954 |
| 2,684,844 | Flint et al. | July 27, 1954 |
| 2,710,769 | Rosenthal | June 14, 1955 |
| 2,719,578 | Flint | Oct. 4, 1955 |
| 2,812,803 | Neely | Nov. 12, 1957 |
| 2,925,120 | Flint | Feb. 16, 1960 |

FOREIGN PATENTS

| | | |
|---|---|---|
| 446,911 | Great Britain | May 8, 1936 |